Nov. 24, 1970   H. POREPP   3,542,911
METHOD OF MAKING A CONTINUOUS ROW OF SLIDE FASTENER
LINKS FROM A PLASTIC THREAD
Original Filed Oct. 27, 1966   3 Sheets-Sheet 1

Hans Porepp
INVENTOR.

BY
Karl F. Ross
Attorney

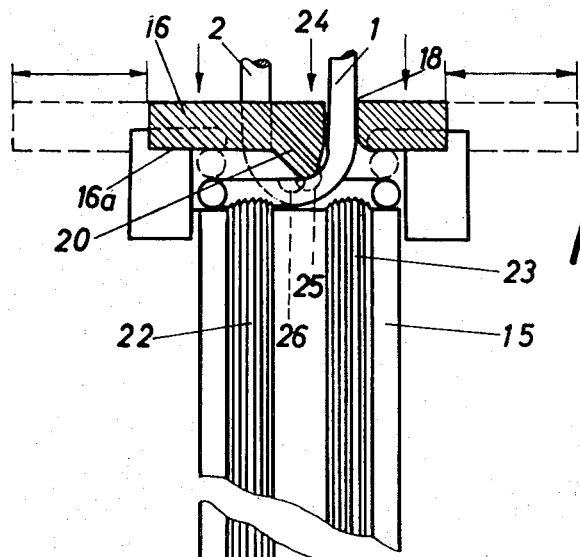
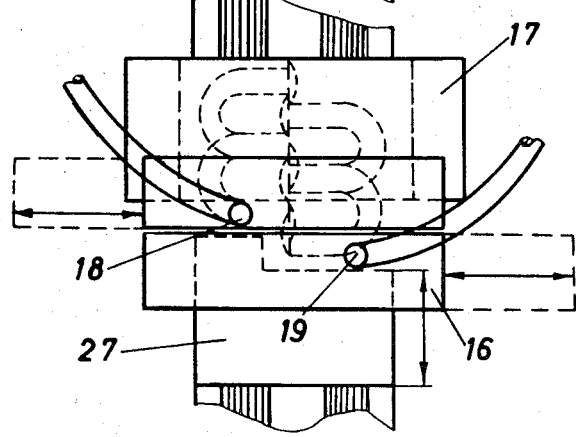
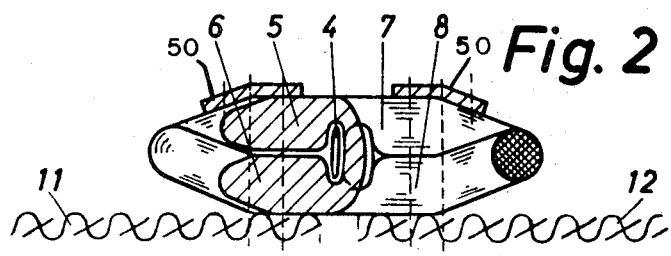

Hans Porepp
INVENTOR.

United States Patent Office 3,542,911
Patented Nov. 24, 1970

3,542,911
METHOD OF MAKING A CONTINUOUS ROW OF SLIDE FASTENER LINKS FROM A PLASTIC THREAD
Hans Porepp, Am Rebberg, Wangen (Bodensee), Germany
Original application Oct. 27, 1966, Ser. No. 590,080, now Patent No. 3,461,486, dated Aug. 19, 1969. Divided and this application Feb. 26, 1969, Ser. No. 831,797
Claims priority, application Germany, Nov. 4, 1965, 1,280,609
Int. Cl. B29c 17/02; B29d 5/00
U.S. Cl. 264—234                              5 Claims

ABSTRACT OF THE DISCLOSURE

A method for making a slide fastener having two rows of interengaging, flattened helical coil coupling links which are fabricated from synthetic threads. Two substantially equal lengths of synthetic thread are advanced axially toward radially outwardly extending guides on the periphery of a cylindrical base. Each synthetic thread is advanced a length sufficient for their respective guides to form a loop of a helical coil, after which a portion of each loop is deformed to form a coupling surface which engages with the coupling surface of the other loop. Simultaneously with the deformation, the loop is kinked in the area of the deformation, so that each leg of the loop lies adjacent the other and a pair of coupling links has been formed. This pair of coupling links is then advanced, as by pushing, and is stabilized by heating. The steps given above are then repeated so as to form a continuous series of interengaging coupling links.

---

This application is a division of application Ser. No. 590,080 filed Oct. 27, 1966 (now U.S. Pat. No. 3,461,-486) issued Aug. 19, 1969.

The invention relates to a method for making a slide fastener chain for a slide fastener, the two halves of which may be sewed to a support tape or stringer, each consisting of a series of coupling links made of a plastic, or synthetic, thread laid in the configuration of a deformed helical spring. The convolution portions of the helical springs extend from the coupling surfaces disposed in superposed relation in planes perpendicular to the longitudinal direction of the slide fastener.

Slide fasteners with series of coupling links made of a thread of plastic material in the form of a deformed helical spring are known, in which the coupling surfaces of one series of links, together with the convolution portions which merge therewith, form loops for the engagement of the coupling surfaces of the other series of links. This means that the winding portions merging with the higher loop are disposed in superposed relation in planes perpendicular to the longitudinal direction of the slide fastener, while the convolution portions having the full pitch and being disposed opposite to the coupling surfaces extend tile-like, or overlapping, one over the other.

SUMMARY OF THE INVENTION

The object of the present invention is to provide a method for making a slide-fastener coupling element, or a series of coupling links, in which the entire width of the series of coupling links is kept evenly as flat as possible and having a height which at no point exceeds the double thickness of the thread, thus assuring an extremely rigid coupling engagement.

Accordingly, the invention resides in that, in a slide fastener as described above, the convolution portions extending from the coupling surfaces initially lie snugly together one above the other, then merge opposite to the coupling surfaces into opposed return bends, and that the coupling surfaces, together with the convolution portions extending therefrom and contacting each other, form ears disposed within the height of the two contacting convolution portions and serving as engagement means for the coupling surfaces of the second series of coupling links of the slide fastener. Thus, the height of the series of coupling links of the slide fastener fixed to a carrier ribbon in no case exceeds the double thickness of the plastic material thread used for its manufacture, and, since the coupling surfaces formed by coining flat ears and sharply kinking the same are disposed within the zone of the height of the double thickness of thread, the coupling surfaces of the other series of coupling links engage with full surface contact behind the ears, whereby the safety against tearing-open is improved substantially.

The slide fastener according to the present invention can be manufactured in a particularly simple manner wherein, according to the method of the invention, the procedure is such that two threads of a synthetic material are guided in one plane while being deflected side-by-side in opposite directions by thread guides along a base and are, after complete overlapping of the overlapping thread portions, provided in staggered relation with coupling surfaces by coining, whereupon the threads are sharply kinked at the coupling surfaces engaging behind each other above the approaching thread extension, and are guided back in contacting engagement thereto, and wherein the two convolution portions of the two series of coupling links, which are coupled by the engaging coupling surfaces are shifted forwardly about one pitch of the helical coil and are stabilized in their positions by applying heat.

BRIEF DESCRIPTION OF THE DRAWINGS

FIG. 2 a cross-sectional view along line II—II of FIG. 1 but to a larger scale than FIG. 1;

FIG. 4 a partially cross-sectional view of the device for performing the method of the present invention, showing the thread guides and a top view of the cylinder below the thread guides;

FIG. 6 a top view of the thread guides with the advancing device; and

DESCRIPTION OF THE PREFERRED EMBODIMENTS

The two series of coupling links of a slide fastener consist each of a plastic thread 1 and 2 shaped to a deformed helical spring, wherein the convolution portions 5, 6 and 7, 8 of both series of coupling links extending outwardly from the coupling surfaces 3 and 4 are disposed in superposed relation snugly contacting each other, merging opposite to the coupling surfaces 3, 4 into oppositely directed exposed return bends 9, 10. This shape of the convolution portions permits continuous manufacture as will be explained later. The coined coupling surfaces 3 and 4, which are flattened widenings of the thread, form with the convolution portions 5, 6 and 7, 8, by sharp kinks of the coupling surfaces, loops disposed within the height of the two contacting convolution portions, into which loop the coupling surfaces of the other series of links engage. Thus, the height of the slide fastener above the carrier ribbon does not exceed the double thickness of the thread. The projecting portions of the coupling surfaces formed by flattening of the thread completely engage in abutting relation in the loops, whereby an extremely secure connection, with perfect safety against tearing-open is achieved.

Figure 3:
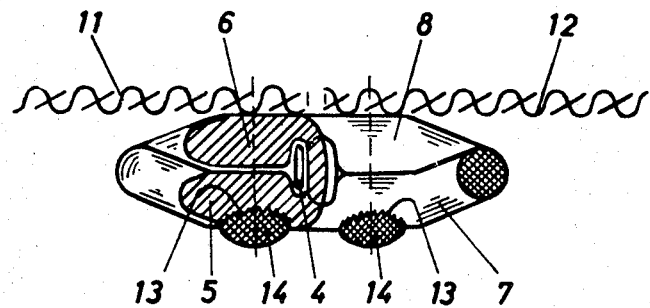
FIG. 3 a cross-sectional view corresponding to FIG. 2, but of a modified embodiment of the coupling links.

The pair of coupling elements or chains of the slide fastener are attached in the well known manner to a carrier ribbon, as by sewing. As shown in FIG. 2, a narrow cover ribbon 50 may be provided as ironing protection; or it is also possible, according to FIG. 3, to provide the outer side of the convolutions facing away from the carrier ribbon with a longitudinally extending groove or recess 13 in which a string 14, or the like, is placed and sewed, together with the coupling elements, to the carrier ribbon, thereby forming an ironing protection. By means of this groove 13, the string 14 and also the series of coupling links, are prevented from shifting laterally. This security may yet be improved in that longitudinally and/or transversely extending serrations are provided in the groove 13, as shown in FIG. 3.

Figure 7:
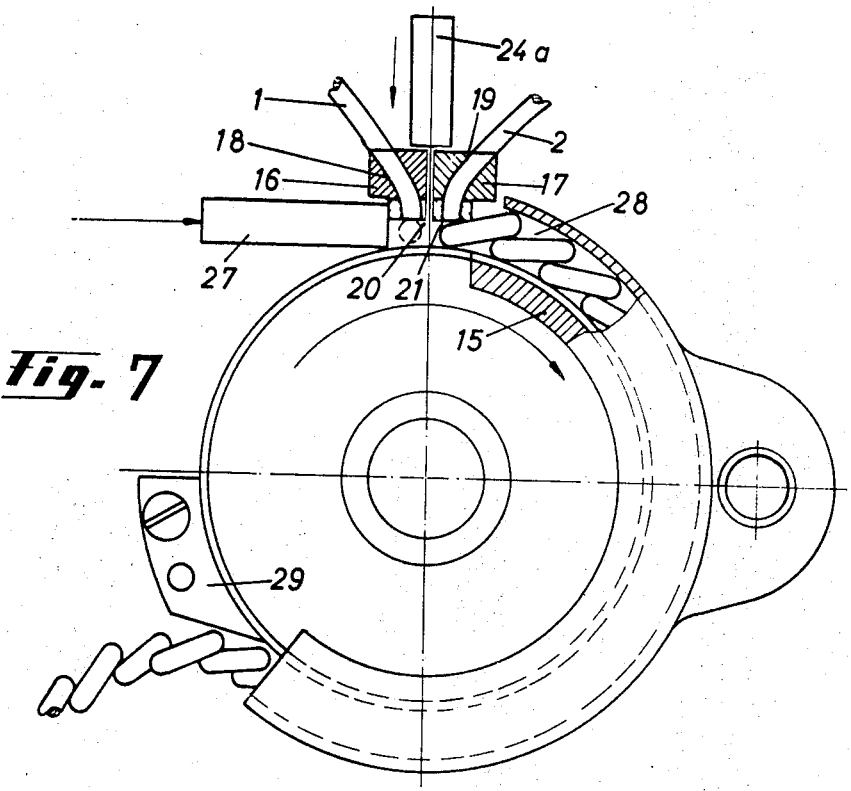
FIG. 7 a side view, partly in section, of the complete device for making the coupled series of coupling links.
Figure 5:
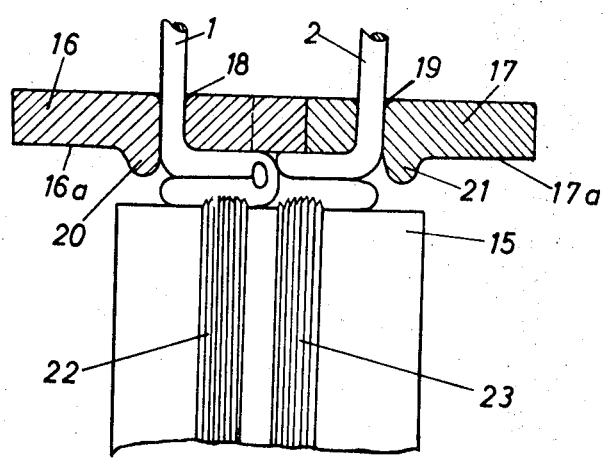
FIG. 5 a cross-sectional view corresponding to FIG. 4, in which the thread guides are in their extreme outward positions.

The method of making a pair of coupling elements of the slide fastener which are in engaging interrelationship with each other is as follows:

The threads 1 and 2 which can be of a well-known synthetic resin, are fed from a supply roll and run over thread tighteners or tension devices, not shown, traverse the bores 18 and 19 and are located opposite the circumferential portions of the cylinder 15 at the outer sides of the beads 22, 23. The thread guides are then moved by a suitable drive (not shown) in a direction towards each other, while the plastic threads are pulled through the bores, the coining projections 20 and 21 urge the threads against the circumferential surface of the cylinder 15, as shown in FIG. 4. The thread guides 16 and 17 then move towards each other, so that the guide bores 18 and 19 pass each other, whereby the plastic threads 1 and 2 overlap each other on the base, or cylinder, 15. At this moment, the thread guides 16 and 17 are pressed against the circumference of the cylinder 15 in the direction indicated by the arrows 24, for example, by means of a cam drive 24a, as shown in FIG. 7, and thereby, produce deformations or in form of widenings of the thread, according to FIG. 7, thus forming the coupling surfaces. Subsequent to this coining operation, the thread guides 16 and 17 return to their initial positions, whereby the threads 1 and 2 are sharply kinked at the deformations 25 and 26 by the rounded bore edges disposed opposite the coining projections 20 and 21 and the under-surfaces 16a and 17a of the two thread guides. This causes the deformations of the two threads to interengage with each other, so that the threads 1 and 2 are flattened in direct contacting engagement during the forward movement. Thus, it is achieved that the two series of coupling links have a height which under no circumstances is higher than twice the thickness of a thread. This extreme position of the thread guide is shown in FIG. 5. It is to be noted that, during the forward movement of the thread guides, the coining projections 20 and 21 are urging the thread tightly against the circumference of the cylinder 15. Due to this pressure, and the provision of the serrated annular beads 22, 23, the longitudinally extending grooves of recesses 13 receiving the strings 14 are formed in the parts of the convolutions of the thread disposed below, as mentioned in connection with FIG. 3.

Figure 1:
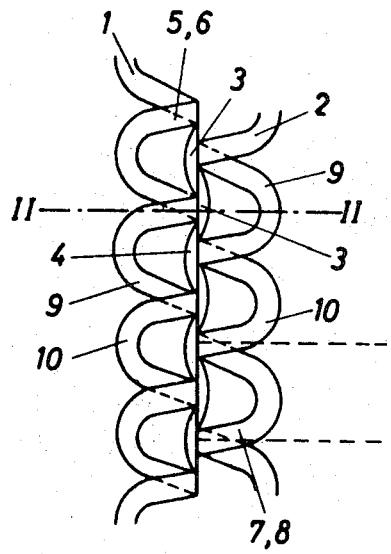
FIG. 1 is a top schematic view of the two series of coupling links of a slide fastener according to the invention in coupling engagement in an enlarged scale.

As soon as the two thread guides move back out of the position shown in FIG. 4 to the position shown in FIG. 5, a slide 27 is actuated. This slide is guided tangentially with respect to the circumference of the cylinder 15 between its circumference and the thread guides. This slide is, as shown in FIG. 6, stepped at the front side corresponding to the shifted position of the two superposed convolution portions of the two series of coupling links, and pushes the convoluted portions forwardly through a distance equal to one pitch spacing of the series of coupling links; the freely rotating cylinder 15 is similarly advanced, and the threads 1 and 2 are pulled through the guide bores 18 and 19, whereby the arcuate shape of the coupling links is achieved, as shown in FIG. 1. Upon renewed forward movement of the thread guides the slide 27 moves backwardly a corresponding distance in which by means of the reciprocating slide movement, which is continuously, but with varying speed, regulated by a corresponding control, so as to achieve the arcuate shape of the individual coupling links. Then the several successive operations are repeated.

The slide 27 pushes the formed coupling links, which engage one another, in a directly connected channel 28 surrounding the cylinder 15 in parallel relation, and having a cross-sectional shape adapted to that of the series of coupling links interengaging each other. Within this channel 28 the coupling elements are subjected to a heat treatment, in a well known manner so as to remove the inner stresses caused by the shaping of the coupling links and to stabilize them. Finally, the series of coupling links, which interengage each other, arrive at the outlet of the channel and are lifted from the cylinder by a wedge 29, and are then attached to carrier ribbons in a known manner. As mentioned above, the freely rotatably journalled cylinder 15 rotates at each advance of the slide 27 with the interengaged series of coupling links about one pitch spacing, so that the interengaged series of coupling links engage the cylinder 15 without friction, so that only the friction on the outer channel walls must be overcome upon the passage through the channel 28.

It will be understood that the above description of the present invention is susceptible to various modifications, changes and adaptations and the same are intended to be comprehended within the meaning and range of equivalents of the appended claims.

What I claim:

1. A method of making a slide-fastener having two rows of interconnected, continuous coupling elements fabricated from synthetic threads, each of which is to be sewn to a supporting ribbon, comprising the steps of:
   (a) advancing two separate, substantially equal lengths of synthetic thread along a common plane toward each other from opposite directions so that the threads pass into respective thread guides at adjacent points;
   (b) forming each of the threads into a helical loop such that a portion of the loop of one thread overlaps a portion of the loop of the other thread;
   (c) successively deforming each of the loops at the overlapping portions thereof so as to form a coupling surface on each loop which engages with the coupling surface on the other loop and simultaneously sharply kinking the loops at the deformations so as to form coupling links having a height which is substantially equal to twice the thickness of the thread;
   (d) advancing said coupling links:
   (e) heating the coupling links to stabilize them; and
   (f) repeating the above steps so that a series of interengaging coupling links is formed.

2. A method as defined in claim 1 wherein said step of forming is carried out by moving the respective thread guides alternately toward and away from each other as the threads advance.

3. A method as defined in claim 2, additionally comprising the step of further deforming the threads on the side to be opposite the side to which the supporting ribbons are to be sewn, for providing a groove extending longitudinally along each row of coupling elements.

4. A method as defined in claim 3 wherein said step of further deforming the threads includes providing transversely extending serrations along the deformed surface.

5. A method of making a slide-fastener having two rows of helical loops each fabricated from a synthetic thread, with a portion of each loop of one thread interengaging between two succeeding loops of the other thread, comprising the steps of:
  (a) advancing two separate, substantially equal lengths of synthetic thread along a common plane toward each other from opposite directions and into bores of respective thread guides;
  (b) forming each of the threads into a row of helical loops by moving the thread guides in a reciprocating manner transverse to the direction of the thread advance and simultaneously supporting the loops from the side opposite the thread guides, so that a portion of each of the loops in each row of loops extends between a portion of each of the loops in the other row of loops;
  (c) successively deforming each of the loops at the overlapping portions thereof so as to form a series of coupling surfaces the adjacent ones of which interlock with one another at the instant they are formed, and simultaneously sharply kinking the loops at the deformation so as to form coupling links having a height which is substantially equal to twice the thickness of the threads;
  (d) advancing said coupling links; and
  (e) heating the coupling links to stabilize them.

References Cited
UNITED STATES PATENTS

| | | | |
|---|---|---|---|
| 3,106,749 | 10/1963 | Streicher | 18—1 |
| 3,196,489 | 7/1965 | Chery | 18—19 |
| 3,431,337 | 3/1969 | Heimberger | 264—281 |

ROBERT F. WHITE, Primary Examiner

R. R. KUCIA, Assistant Examiner

U.S. Cl. X.R.

264—281, 285